Patented May 22, 1934

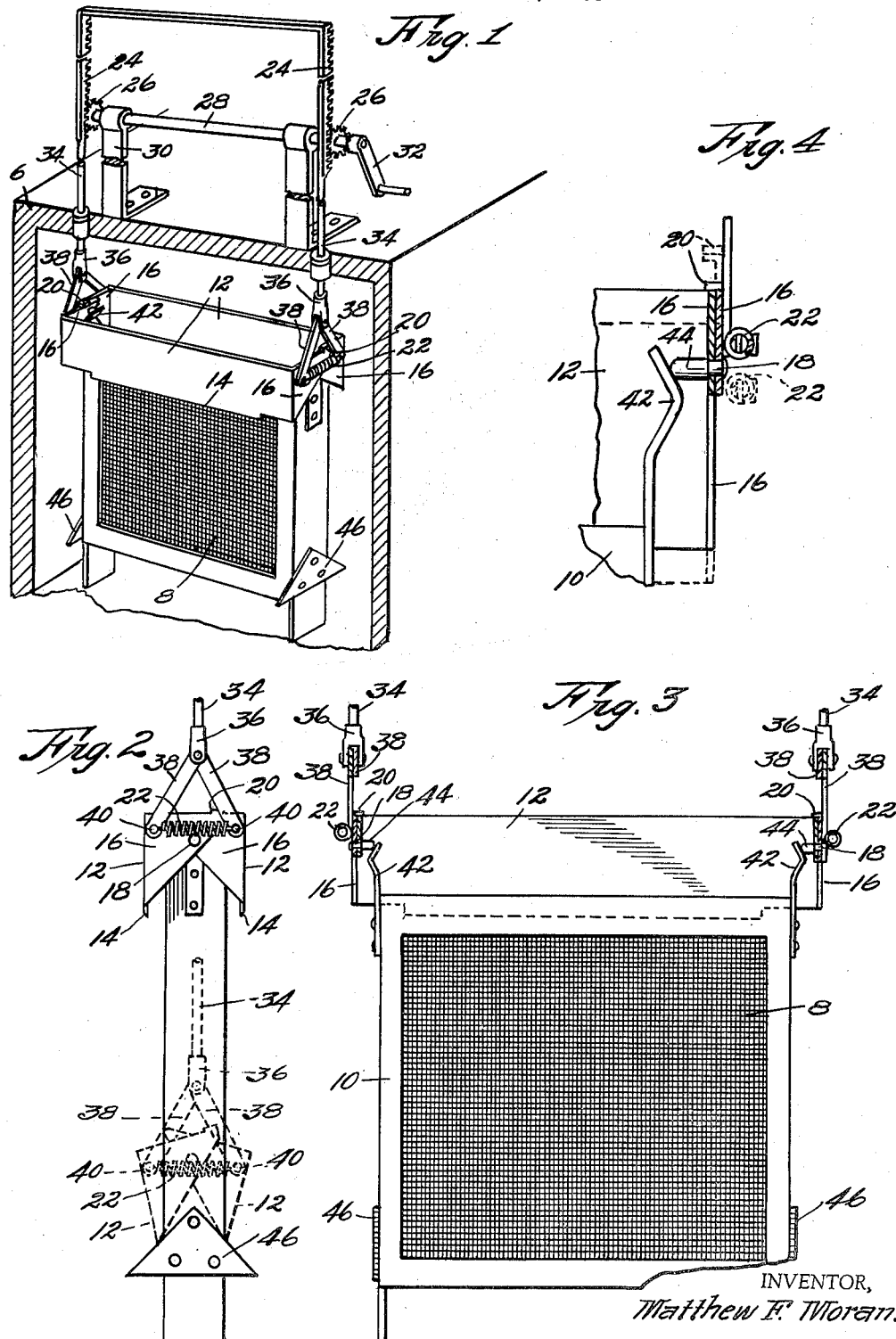

1,959,491

UNITED STATES PATENT OFFICE 1,959,491

FILTER SCREEN WIPER

Matthew F. Moran, Kansas City, Mo.

Application March 3, 1933, Serial No. 659,513

8 Claims. (Cl. 210—152)

This invention relates to filter structures and has as a primary object, the provision therein of simple, effective and durable means for quickly and positively removing from the filter screens deposits which collect thereon during operation of the filter.

One of the important aims of this invention is the contemplation of a filter screen wiper particularly constructed for use with double-faced filter units, and especially made so as to be manually reciprocated back and forth along the filter screen face, the parts of the structure being so disposed as to maintain the wiper jaws in engagement with the filter sheet as they travel in one direction therealong and to maintain these jaws away from the filter sheets as they are moved therealong in the opposite direction.

Further objects of the invention include the novel means for holding the jaws at one end of their path of travel until they have been moved against the filter sheets preparatory to cleaning the same as the jaws are moved therealong in one direction.

A large number of exceptionally important minor objects are involved in this invention and such will be fully disclosed in the specification, referring to the accompanying drawing, wherein one form of the invention is shown, and wherein:

Figure 1 is a fragmentary, perspective view of one filter unit having associated therewith wiper mechanism embodying this invention.

Fig. 2 is an end elevation of a filter unit with the associated wiper structure shown at each end of its path of travel.

Fig. 3 is a longitudinal, central, vertical section through a portion of the filter screen wiper showing the same in association with a filter unit, the latter being in elevation, and, Fig. 4 is an enlarged, fragmentary, detailed, sectional view through one end of a portion of the filter screen wiper, illustrating the manner in which the jaws are forced against the screen before movement along its effective path of travel.

Filter screen wipers of the character contemplated might be used with practically any form of double-faced filter units such as are used in large filter tanks 6. The passage of liquids through the filter sheets 8 leaves a deposit on the outer face thereof and soon clogs the interstices between the woven fabric or filter screen. This deposit must be cleaned from sheets 8 and where no provision is made for such cleaning from exteriorly of tank 6, it is necessary to completely disassemble a large filter and clean all filter sheets 8 by hand.

The filter unit with which the wiper structure is herein shown to be used comprises a frame 10 having opposed filter sheets 8 which are disposed in substantially vertical positions and in parallel relation to each other. It is the outer face of these sheets 8 that must be wiped or scraped and such is accomplished by the employment of a pair of wiper jaws 12, having suitably formed edges 14 which are drawn against the outer face of sheets 8. These jaws are preferably formed as illustrated in Fig. 1 and each has an inturned end 16 which overlaps the similar inturned end of the opposed jaw 12 and is pivotally joined by a pintle 18, around which jaws 12 travel toward and from filter sheets 8. Their outward movement is limited by a stop 20 in the form of an inturned lug integral with one of the ends 16.

Common means to yieldably maintain jaws 12 in either the open or closed position is provided in the form of a spring 22 which joins the two articulated jaws 12 and which moves from one side of pintle 18 to the other in order to set up a "past center" action which will perform the desired function. When spring 22 is in the position shown in Figs. 1 and 2, jaws 12 are maintained out of engagement with sheets 8. When spring 22 is in the position shown in dotted lines of Fig. 2, jaws are held against sheets 8.

Means is provided for manually moving jaws 12 back and forth across the face of the filter unit. This means is here shown to be a pair of racks 24, each in mesh with an operating pinion 26 that is mounted upon shaft 28, journalled in bearings 30 and rotated about its axis by crank 32. Racks 24 merge into rods 34 which project into tank 6 and each of said rods carries a bifurcated head 36, to which is pivotally joined one end of a pair of links 38. The free ends of these links are attached to ends 16 of the jaws at points where spring 22 is joined to the same and these points of connection indicated at 40 are pivotal points so that the desired action might take place. Obviously, upon turning crank 32 the entire associated structure will be moved.

At the beginning of the operation of cleaning, jaws 12 are held apart by spring 22, as shown in Fig. 1 and full lines of Fig. 4. A resilient member 42, carried by frame 10, is in engagement with the inwardly projected portion 44 of pintle 18 and as downward force is imparted to links 38, jaws 12 are moved inwardly against sheets 8 as member 42 engages portion 44 to preclude movement of jaws 12 along the filter unit. It is obvious that several of the scrapers might be operatively connected to a single operating mechanism without departing from the spirit of the invention.

The downward force imparted to links 38 will expand spring 22 and move it below pintle 18 to snap jaws 12 into engagement with filter sheets 8. After this has been done, further force will cause member 42 to be bent inwardly and portion 44 will snap past the high points formed thereon to allow travel of the wiper jaws downwardly along filter sheets 8. In so doing, edges 14 will scrape and wipe away any foreign matter that might be collected on the outer faces of sheets 8.

When jaws 12 reach the end of the path of travel in the downward direction, opener bracket 46, rigidly secured to frame 10, will engage the lower edges of jaws 12 and force these jaws outwardly until spring 22 is moved above pintle 18 where it will there maintain the jaws in an open position. After this has been done the manually operable mechanism is reversed and the jaws are moved back to the point of beginning. Obviously, jaws 12 will not engage sheets 8 as they travel along in this direction. A sufficient force is exerted at the upper end of the path of travel to again move portion 44 back to the position against member 42 so that a repetition of the aforementioned operation will take place when it is again desired to scrape the faces of sheet 8. Obviously, the operation just described might be repeated as often as is necessary to complete one thorough cleaning of filter sheets 8.

While many alterations might be made in the specific construction of a filter screen wiper of this character, it is desired to be limited in such practice only by the scope of the appended claims.

Having thus described the invention, what is claimed as new and desired to be secured by Letters Patent is:

1. A filter screen wiper for double-faced filter units comprising a pair of opposed wipers; pivotally interconnected end members integral with the wipers; resilient means to draw one edge of the wipers around the pivotal points against the faces of the filter units as the former are moved along the latter; and means to force the wipers out of engagement with the faces when the wipers reach the end of their path of travel in one direction.

2. A filter screen wiper for double-faced filter units comprising a pair of opposed wipers; pivotally interconnected end members integral with the wipers; resilient means to draw one edge of the wipers around the pivotal points against the faces of the filter units as the former are moved along the latter; and means to force the wipers out of engagement with the faces when the wipers reach the end of their path of travel in one direction, said resilient means being utilized to maintain the wipers out of engagement with the filter unit faces as the wipers are moved through their path of travel in the opposite direction.

3. A filter screen wiper for double-faced filter units comprising a pair of opposed wipers; pivotally interconnected end members integral with the wipers; resilient means joining the wipers at their ends to both maintain the jaws against the faces of the unit and hold the wipers away from the said faces as the wipers are moved toward and from each other respectively around the pivotal points; and means for moving the wipers across the faces of the filter unit.

4. A filter screen wiper for double-faced filter units comprising a pair of opposed wipers; pivotally interconnected end members integral with the wipers; resilient means joining the wipers at their ends to both maintain the jaws against the faces of the unit and hold the wipers away from the said faces as the wipers are moved toward and away from said faces respectively around the pivotal points; yieldable, relatively stationary, means for maintaining the wipers at one end of their path of travel until the wipers are moved against the filter unit faces; and means for moving the wipers to said position and along the length of said filter unit faces.

5. A filter screen wiper for double-faced filter units comprising a pair of opposed wipers; pivotally interconnected end members integral with the wipers; resilient means joining the wipers at their ends to both maintain the jaws against the faces of the unit and hold the wipers away from the said faces as the wipers are moved toward and away from said faces respectively around the pivotal points; yieldable, relatively stationary, means for maintaining the wipers at one end of their path of travel until the wipers are moved against the filter unit faces; means for moving the wipers to said position and along the length of said filter unit faces; and an opener bracket at the other end of the path of travel of said wipers to force the same out of engagement with the said faces when the wipers reach said end.

6. In combination with a filter screen having a frame and two opposed substantially parallel filter screens supported in spaced-apart relation by the frame, structure for removing collected matter from the outer faces of the screens comprising a wiper jaw for each screen; means pivotally interconnecting the jaws at each end thereof; a spring joining the jaws and movable to position above and below the pivotal point whereby to hold the jaws against or away from the filter screens.

7. In combination with a filter screen having a frame and two opposed substantially parallel filter screens supported in spaced-apart relation by the frame, structure for removing collected matter from the outer faces of the screens comprising a wiper jaw for each screen; inturned overlapping ends on each jaw; means pivotally interconnecting the inturned ends; a spring joining the jaws and movable to position above and below the pivot means as the jaws are moved against and away from the screens whereby to maintain yielding pressure on the jaws to so hold the same; a stop to limit outward movement of the jaws; yieldable means to hold the jaws against travel in one direction along the filter screen until the former have been moved against the latter; and means to force the jaws away from the filter screens before they travel therealong in the opposite direction.

8. In combination with a filter screen having opposed filter sheets of means for simultaneously wiping the two sheets comprising a pair of opposed jaws; means for reciprocating the jaws along the said sheets; means for drawing the jaws against the sheets at one end of their path of travel; and means for forcing the jaws away from the sheets as the other end of the path of travel is reached whereby the jaws scrape the two sheets as they travel therealong in one direction, and remain spaced therefrom as they move through their path of travel in the opposite direction.

MATTHEW F. MORAN.